United States Patent
Oyang et al.

(10) Patent No.: US 6,909,907 B1
(45) Date of Patent: Jun. 21, 2005

(54) INTEGRATED CONNECTION ASSEMBLY FOR GLOBAL POSITIONING SYSTEM (GPS) RECEIVER AND PERSONAL DIGITAL ASSISTANCE (PDA) DEVICE OR CELLULAR PHONES

(75) Inventors: James Oyang, Palos Verdes, CA (US); Anchyun Wang, Cerritos, CA (US)

(73) Assignee: PHAROS Science & Applications, Inc., Torrance, CA (US)

( * ) Notice: Subject to any disclaimer, the term of this patent is extended or adjusted under 35 U.S.C. 154(b) by 1061 days.

(21) Appl. No.: 09/710,211

(22) Filed: Nov. 10, 2000

(51) Int. Cl.⁷ .......................... H01R 1/100; H04M 1/00
(52) U.S. Cl. ................ 455/556.1; 455/556.2; 455/557; 455/550.1; 340/805.03; 340/825.52; 342/357.1; 439/502
(58) Field of Search ..................... 455/556.1, 556.2, 455/557, 550.1, 571, 572–573, 569.2, 575.7, 575.9, 90.3, 349, 347, 346, 345, 456.1; 701/1, 10, 36; 340/825.52, 825.03; 342/357.1, 385; 439/502, 638, 650

(56) References Cited

U.S. PATENT DOCUMENTS

| | | | |
|---|---|---|---|
| 4,061,971 A | * 12/1977 | Barrons | 455/90.3 |
| 5,121,504 A | * 6/1992 | Toko | 455/575.9 |
| 5,177,667 A | * 1/1993 | Graham et al. | 361/715 |
| 5,479,479 A | * 12/1995 | Braitberg et al. | 455/404.1 |
| 5,497,339 A | * 3/1996 | Bernard | 342/357 |
| 5,528,248 A | * 6/1996 | Steiner et al. | 342/357.06 |
| 5,895,431 A | * 4/1999 | Miller et al. | 455/575.9 |
| 6,007,372 A | * 12/1999 | Wood | 439/502 |
| 6,048,184 A | * 4/2000 | Chang et al. | 455/575 |
| 6,121,922 A | * 9/2000 | Mohan | 342/357.1 |
| 6,532,374 B1 | * 3/2003 | Chennakeshu et al. | 455/569.1 |

* cited by examiner

*Primary Examiner*—Sinh Tran
*Assistant Examiner*—Kamran Afshar
(74) *Attorney, Agent, or Firm*—Thomas I. Rozsa; Tony D. Chen

(57) ABSTRACT

An integrated connection assembly for a global positioning satellite (GPS) receiver and a personal digital assistance (PDA) device or cellular phone. The integrated connection assembly includes a power adapter, an interface circuitry, a filter circuitry, and cable links. The power adapter has an external power connector adapted to be connected to an external power source for obtaining an external power, and an internal transformer and charger for converting the external power to an internal power suitable for the GPS receiver and the PDA device or cellular phone. The interface circuitry converts different interfaces of the GPS receiver and the PDA device or cellular phone. The filter circuitry prevents interferences between the GPS receiver and the PDA device or cellular phone. The integrated connection assembly also includes component parts for providing connection to the GPS receiver and the PDA device or cellular phone. The cable links electrically and electronically interconnect and couple the power adapter, the interface circuitry, the filter circuitry, the GPS receiver and the PDA device or cellular phone to provide the internal power to the GPS receiver and the PDA device or cellular phone. At least part of the cable links between the GPS connection and the PDA or cellular phone connection is also capable of providing data transfer therebetween.

12 Claims, 2 Drawing Sheets

INTEGRATED CONNECTION ASSEMBLY FOR GLOBAL POSITIONING SYSTEM (GPS) RECEIVER AND PERSONAL DIGITAL ASSISTANCE (PDA) DEVICE OR CELLULAR PHONES

BACKGROUND OF THE INVENTION

1. Field of the Invention

The present invention relates generally to the field of connector cables and accessories used together with portable electronic devices. More particularly, the present invention relates to the field of connector cable and accessories for interconnecting global positioning satellite (GPS) receivers and personal digital assistance (PDA) devices or cellular phones.

2. Description of the Prior Art

Generally, cables and accessories used together with portable electronic devices have been introduced in the art. For example, connectors and cables for powering a portable electronic device or cellular phone from a vehicle cigaret lighter or similar power source have been introduced in the art. In addition, various data cables used for interlinking portable electronic devices have also been introduced in the art.

Recently, personal digital assistance (PDA) devices such as Microsoft® Pocket PC™ or Palm® portable computers are widely used. In addition, small and compact sized global positioning satellite (GPS) receivers have also became more popular. One trend of a combined use of these devices is to connect a GPS receiver with a PDA and turn it into a personal mobile navigation system or mobile telematic systems.

In addition, some new cellular phones are designed and constructed with large display screens and more powerful processors, allowing the cellular phones to be used, in combination with a GPS receiver, as a personal mobile navigation system.

However, many PDA and cellular phone accessories and cables are designed to be used only with a particular type or model of PDA devices or cellular phones, without taking into the consideration of a combined use of a GPS receiver and a PDA device or cellular phone. Therefore, it is desirable to provide an integrated connection assembly for and a GPS receiver and a PDA device or cellular phone to provide mobile people with location sensitive information, to guide them to their destination effectively, and to provide faster assistance when they need help on the road.

SUMMARY OF THE INVENTION

The present invention is integrated connection assembly for a global positioning satellite (GPS) receiver and a personal digital assistance (PDA) device or cellular phone.

It is an object of the present invention to provide a unique and integrated power and data exchange cable connecter assembly for interconnecting a GPS receiver and a PDA device or cellular phone used together in a vehicle to form an instant mobile navigation system It is also an object of the present invention to provide a unique and integrated power and data exchange cable connecter assembly for interconnecting a GPS receiver and a PDA device or cellular phone to provide mobile people with location sensitive information.

It is another object of the present invention to provide a unique and integrated power and data exchange cable connecter assembly for interconnecting a GPS receiver and a PDA device or cellular phone to guide mobile people to their destination effectively.

It is an additional object of the present invention to provide a unique and integrated power and data exchange cable connecter assembly for interconnecting a GPS receiver and a PDA device or cellular phone to provide mobile people with faster assistance when they need help on the road.

It is a further object of the present invention to provide a unique and integrated power and data exchange cable connecter assembly for interconnecting a GPS receiver and a PDA device or cellular phone that is compact, durable and easy to use.

Described generally, the present invention is an integrated connection assembly for a global positioning satellite (GPS) receiver and a personal digital assistance (PDA) device or cellular phone. The integrated connection assembly includes a power adapter, an interface unit, a filter unit, connecters for the GPS receiver and for the PDA device or cellular phone, and cable links. The power adapter has an external power connector adapted to be connected to an external power source for obtaining an external power, and an internal transformer and charger for converting the external power to a direct current power suitable for the PDA device and the GPS receiver. The interface unit has internal interface circuitry for interfacing with different interfaces of the GPS receiver and the PDA device or cellular phone. The filter unit has internal filter circuitry for preventing interferences between the GPS receiver and the PDA device or cellular phone. The cable links electrically and electronically interconnect and couple the power adapter, the interface unit, the filter unit, the GPS connecter and the PDA or cellular phone connecter to provide the direct current power to the GPS receiver and the PDA device or cellular phone. At least a portion of the cable links between the GPS connecter and the PDA or cellular phone connecter and is also capable of providing data transfer therebetween.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
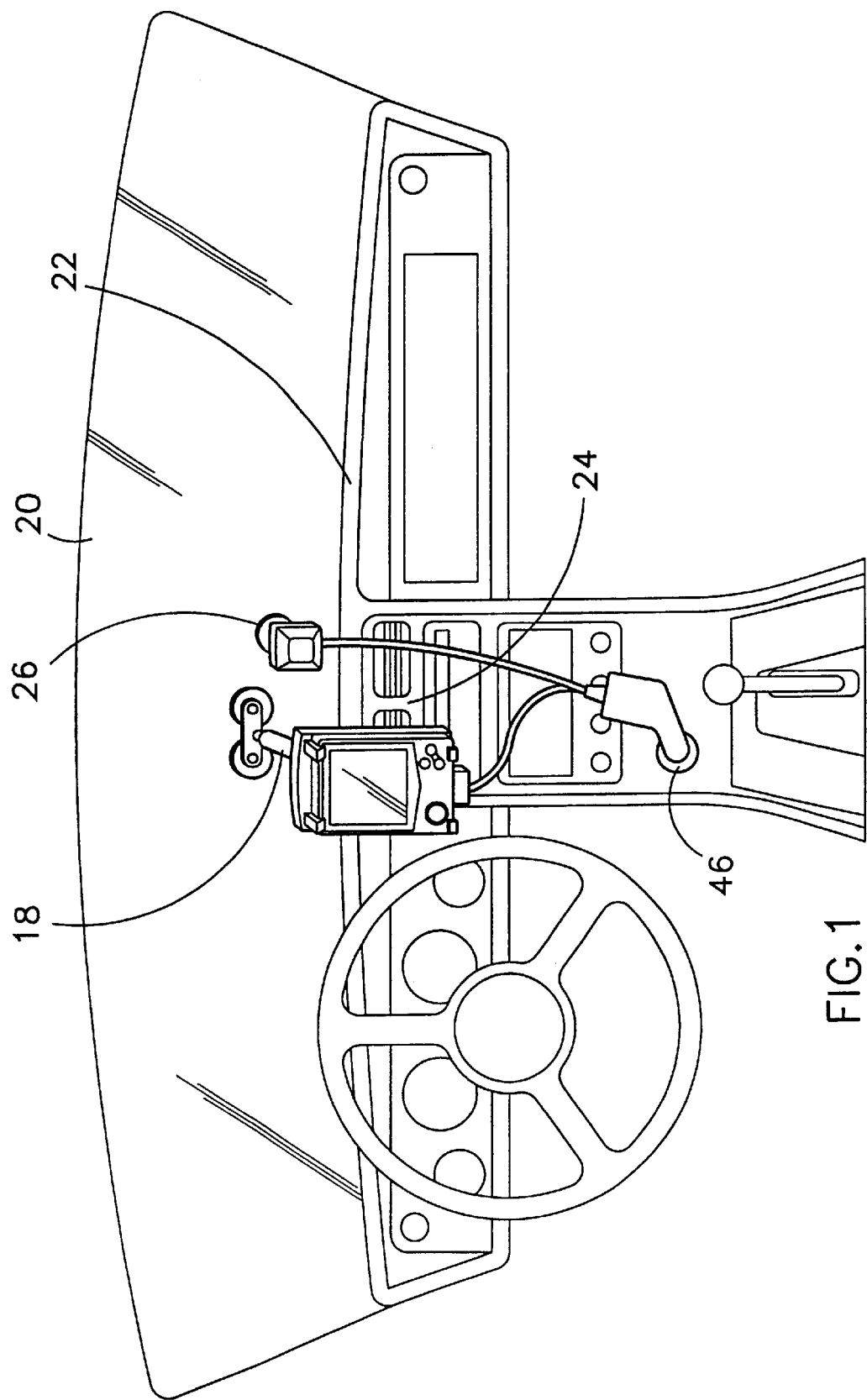
FIG. 1 is a perspective view showing the present invention integrated connection assembly interconnecting a GPS receiver and a PDA device or cellular phone and used together in a vehicle to form an instant mobile navigation system.
Figure 2:
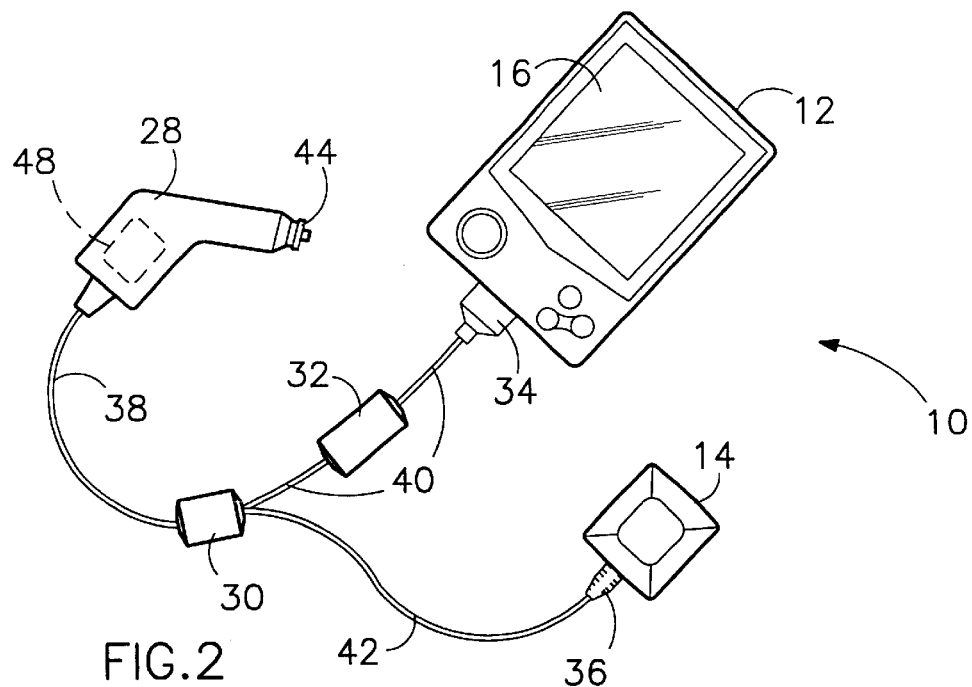
FIG. 2. is a perspective view showing the present invention integrated connecter assembly for a GPS receiver and a PDA device or cellular phone.

Referring to FIGS. 1 and 2, there is shown the present invention integrated connection assembly 10 for a personal digital assistance (PDA) device 12 and a global positioning satellite (GPS) receiver 14. In a typical application, a user uses the PDA devices 12, such as a Microsoft® Pocket PC™ or a Palm® portable computer, or a cellular phone (not shown), and a GPS receiver 14 together as a mobile navigation system. With appropriate software program installed and executing in the PDA device 12, the satellite signals received by the GPS receiver 14 are processed and computed by the PDA device 12 and the instant location of the user can be displayed on a map shown on the display screen 16 of the PDA device 12.

Referring to FIG. 1 particularly, there is shown a typical set up in a user's vehicle. The PDA 12 may be held by a mounting bracket 18 to the windshield 20 (as shown) or dashboard 22 or the instrument panel 24, or other convenient places of the vehicle. The GPS 14 may be held by a retaining device 26 to the windshield 20 (as shown) or dashboard 22 or other convenient places of the vehicle.

It is preferable that the PDA device 12 is positioned to be easily viewed by the user, and the GPS receiver 14 is positioned at a location not shielded by the frame structure of the vehicle so that the sensitivity of the GPS receiver 14 is not compromised.

Referring again to FIG. 2, the present invention integrated connection assembly 10 includes a power adaptor 28, an interface unit 30, a filter unit 32, a PDA connecter 34, a GPS connecter 36, and cable links 38, 40 and 42.

The power adapter 28 has a vehicle cigaret lighter connecter 44 which can be plugged into a vehicle cigaret lighter socket 46 (shown in FIG. 1) or other vehicle power sockets for drawing electric power from the vehicle's battery. The power adapter 28 also contains an internal transformer and changer 48 converting the typical 12V DC of the vehicle's battery power to 5V, 3A DC as the power source for both the PDA device 12 and the GPS receiver 14. The internal transformer and changer 48 also charges the internal rechargeable battery of the PDA device 12.

The interface unit 30 has an internal electronic circuitry for handling the different interfaces between the PDA device 12 and the GPS receiver 14. For example, some PDA devices may have an USB interface while the GPS receivers may have an RS232 interface. The internal interface circuitry will match these different interfaces to insure smooth data transfer therebetween. Cable link 38 interconnects and electrically and electronically couples the power adapter 28 and the interface unit 30.

The filter unit 32 has an internal electronic filter circuitry for shielding electronic interferences and noises between the PDA device 12 and the GPS receiver 14 to prevent any compromise of the sensitivity of the GPS receiver 14. The filter circuitry also provides shielding between the power adapter 28 and the PDA device 12.

The PDA connecter 34 is designed to be plugged into an external interface port of the PDA device 12. Cable links 40 interconnect and electrically and electronically couple the interface unit 30, the filter unit 32, and the PDA connecter 34.

Similarly, the GPS connecter 36 is designed to be plugged into an external interface port of the GPS receiver 14. Cable link 42 interconnects and electrically and electronically couples the interface unit 30 and the GPS connecter 38.

Figure 3:
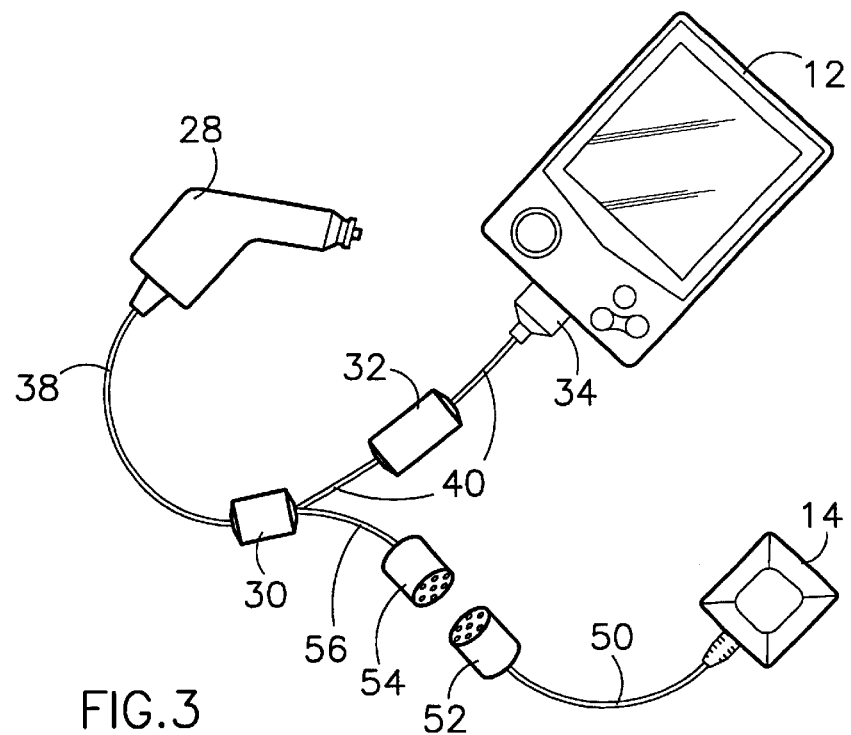
FIG. 3. is a perspective view showing an alternative embodiment of the present invention integrated connector assembly for GPS receiver and a PDA device or cellular phone.

Referring to FIG. 3, there is shown an alternative embodiment of the present invention. In this alternative embodiment, the GPS receiver 14 has an external cable 50 which is an integral and built-in part of the GPS receiver 14 and which terminates into an external connecter 52. In this case, no separate external connecter 38 is needed. However, a complimentary connecter 54 is provided for connection with the external connecter 52 of the GPS receiver 14. When connecters 52 and 54 are connected, the GPS receiver 14 is electrically and electronically coupled with the remaining parts of the connecter assembly 10.

It is noted that cable links 40, 42, 50 and 56 are capable of providing not only electrical power to the PDA device 12 and the GPS receiver 14 respectively, but also data transfer between the PDA device 12 and the GPS receiver 14.

It is also noted that while a PDA device is discussed hereinabove and shown in the figures, it may be replaced by a cellular phone which has similar functions as the PDA device in connection with this mobile navigation application.

The present invention integrated connection assembly for GPS receivers and PDA devices or cellular phones has many advantages. It provides a simple and unified apparatus for interconnecting and powering a GPS receiver and a PDA device or cellular phone. It can be used as a compact and portable navigation system for many equipments, vehicles, motorcycles, boats, etc. It is also of simple construction and very easy to use. It further conforms to conventional forms of manufacture or any other conventional way known to those persons skilled in the art.

Defined in detail, the present invention is an integrated connection assembly for a global positioning satellite (GPS) receiver and a personal digital assistance (PDA) device or cellular phone, comprising: (a) a power adapter having an external power connector adapted to be connected to an external power source for obtaining an external power, and an internal transformer and charger for converting said external power to a direct current power suitable for said GPS receiver and said PDA device or cellular phone; (b) an interface unit having internal interface circuitry for interfacing with different interfaces of said GPS receiver and said PDA device or cellular phone; (c) a filter unit having internal filter circuitry for preventing interferences between said GPS receiver and said PDA device or cellular phone; (d) a GPS connector for connecting to said GPS receiver; (e) a PDA or cellular phone connector for connecting to said PDA device or cellular phone; (f) a cable link for electrically and electronically interconnecting and coupling said power adapter, said interface unit, said filter unit, said GPS connecter and said PDA or cellular phone connecter to provide said direct current power to said GPS receiver and said PDA device or cellular phone; and (g) at least a portion of said cable link between said GPS connecter and said PDA or cellular phone connecter also being capable of providing data transfer therebetween.

Defined alternatively, the present invention is an integrated connection assembly for a global positioning satellite (GPS) receiver and a personal digital assistance (PDA) device or cellular phone, where said GPS receiver has an integral cable link connected to an external connecter, comprising: (a) a power adapter having an external power connector adapted to be connected to an external power source for obtaining an external power, and an internal transformer and charger for converting said external power to a direct current power suitable for said GPS receiver and said PDA device or cellular phone; (b) an interface unit having internal interface circuitry for interfacing with different interfaces of said GPS receiver and said PDA device or cellular phone; (c) a filter unit having internal filter circuitry for preventing interferences between said GPS receiver and said PDA device or cellular phone; (d) a complimentary connector for connecting with said external connecter of said GPS receiver; (e) a PDA or cellular phone connector for connecting to said PDA device or cellular phone; (f) a cable link for electrically and electronically interconnecting and coupling said power adapter, said interface unit, said filter unit, said GPS connecter and said PDA connecter or cellular phone to provide said direct current power to said GPS receiver and said PDA device or cellular phone; and (g) at least a portion of said cable link between said complimentary connecter and said PDA or cellular phone connecter also being capable of providing data transfer therebetween.

Defined broadly, the present invention is an integrated connection assembly for a global positioning satellite (GPS) receiver and a personal digital assistance (PDA) device or a cellular phone, comprising: (a) a power adapter having an external power connector adapted to be connected to an external power source for obtaining an external power, and an internal transformer and charger for converting said external power to an internal power suitable for said GPS receiver and said PDA device or cellular phone; (b) an internal interface circuitry for interfacing with different interfaces of said GPS receiver and said PDA device or cellular phone; (c) an internal filter circuitry for preventing interferences between said GPS receiver; (d) means for providing connection to said GPS receiver; (e) means for providing connection to said PDA device or cellular phone; (f) cable means for electrically and electronically interconnecting and coupling said power adapter, said interface circuitry, said filter circuitry, said GPS connection means and said PDA or cellular phone connection means to provide said internal power to said GPS receiver said PDA device or cellular phone; and (g) at least part of said cable means between said GPS connection means and said PDA or cellular phone connection means also being capable of providing data transfer therebetween.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. An integrated connection assembly for a global positioning satellite (GPS) receiver and a personal digital assistance (PDA) device or cellular phone, comprising:
    a. a power adapter having an external power connector adapted to be connected to an external power source for obtaining an external power, and an internal transformer and charger for converting said external power to a direct current power suitable for said GPS receiver and said PDA device or cellular phone;
    b. an interface unit having internal interface circuitry for interfacing with different interfaces of said GPS receiver and said PDA device or cellular phone;
    c. a filter unit having internal filter circuitry for preventing interferences between said GPS receiver and said PDA device or cellular phone;
    d. a GPS connector for connecting to said GPS receiver;
    e. a PDA or cellular phone connector for connecting to said PDA device or cellular phone;
    f. a cable link for electrically and electronically interconnecting and coupling said power adapter, said interface unit, said filter unit, said GPS connecter and said PDA or cellular phone connecter to provide said direct current power to said GPS receiver and said PDA device or cellular phone; and
    g. at least a portion of said cable link between said GPS connecter and said PDA or cellular phone connecter also being capable of providing data transfer therebetween.

2. The integrated connection assembly in accordance with claim 1, wherein said external power connector of said power adapter is a plug designed to be connected to a vehicle power socket for obtaining power for a vehicle battery.

3. The integrated connection assembly in accordance with claim 1, wherein said filter unit is connected between said GPS connecter and said PDA or cellular phone connector.

4. The integrated connection assembly in accordance with claim 1, wherein said interface unit is connected between said GPS connecter and said PDA or cellular phone connecter.

5. An integrated connection assembly for a global positioning satellite (GPS) receiver and a personal digital assistance (PDA) device or cellular phone, where said GPS receiver has an integral cable link connected to an external connecter, comprising:
    a. a power adapter having an external power connector adapted to be connected to an external power source for obtaining an external power, and an internal transformer and charger for converting said external power to a direct current power suitable for said GPS receiver and said PDA device or cellular phone;
    b. an interface unit having internal interface circuitry for interfacing with different interfaces of said GPS receiver and said PDA device or cellular phone;
    c. a filter unit having internal filter circuitry for preventing interferences between said GPS receiver and said PDA device or cellular phone;
    d. a complimentary connector for connecting with said external connecter of said GPS receiver;
    e. a PDA or cellular phone connector for connecting to said PDA device or cellular phone;
    f. a cable link for electrically and electronically interconnecting and coupling said power adapter, said interface unit, said filter unit, said GPS connecter and said PDA connecter or cellular phone to provide said direct current power to said GPS receiver and said PDA device or cellular phone; and
    g. at least a portion of said cable link between said complimentary connecter and said PDA or cellular phone connecter also being capable of providing data transfer therebetween.

6. The integrated connection assembly in accordance with claim 5, wherein said external power connector of said power adapter is a plug designed to be connected to a vehicle power socket for obtaining power for a vehicle battery.

7. The integrated connection assembly in accordance with claim 5, wherein said filter unit is connected between said complimentary connecter and said PDA or cellular phone connecter.

8. The integrated connection assembly in accordance with claim 5, wherein said interface unit is connected between said complimentary connecter and said PDA or cellular phone connecter.

9. An integrated connection assembly for a global positioning satellite (GPS) receiver and a personal digital assistance (PDA) device or a cellular phone, comprising:
   a. a power adapter having an external power connector adapted to be connected to an external power source for obtaining an external power, and an internal transformer and charger for converting said external power to an internal power suitable for said GPS receiver and said PDA device or cellular phone;
   b. an internal interface circuitry for interfacing with different interfaces of said GPS receiver and said PDA device or cellular phone;
   c. an internal filter circuitry for preventing interferences between said GPS receiver;
   d. means for providing connection to said GPS receiver;
   e. means for providing connection to said PDA device or cellular phone;
   f. cable means for electrically and electronically interconnecting and coupling said power adapter, said interface circuitry, said filter circuitry, said GPS connection means and said PDA or cellular phone connection means to provide said internal power to said GPS receiver said PDA device or cellular phone; and
   g. at least part of said cable means between said GPS connection means and said PDA or cellular phone connection means also being capable of providing data transfer therebetween.

10. The integrated connection assembly in accordance with claim 9, wherein said external power connector of said power adapter is a plug designed to be connected to a vehicle power socket for obtaining power for a vehicle battery.

11. The integrated connection assembly in accordance with claim 9, wherein said filter circuitry is connected between said GPS connection means and said PDA or cellular phone connection means.

12. The integrated connection assembly in accordance with claim 9, wherein said interface unit is connected between said GPS connection means and said PDA or cellular phone connection means.

* * * * *